(12) United States Patent
Katou et al.

(10) Patent No.: US 8,332,881 B2
(45) Date of Patent: Dec. 11, 2012

(54) OPTICAL DISC APPARATUS WITH SUPPORT PART CONFIGURED TO REDUCE VIBRATIONS

(75) Inventors: Seiichi Katou, Tsuchiura (JP); Yoshiaki Yamauchi, Omitama (JP); Ikuo Nishida, Ebina (JP); Youichi Narui, Matsudo (JP)

(73) Assignees: Hitachi, Ltd., Tokyo (JP); Hitachi-LG Data Storage, Inc., Tokyo (JP)

(*) Notice: Subject to any disclaimer, the term of this patent is extended or adjusted under 35 U.S.C. 154(b) by 906 days.

(21) Appl. No.: 12/141,952

(22) Filed: Jun. 19, 2008

(65) Prior Publication Data

US 2008/0320507 A1    Dec. 25, 2008

(30) Foreign Application Priority Data

Jun. 19, 2007   (JP) ................. 2007-161557

(51) Int. Cl.
*G11B 7/00*   (2006.01)
*G11B 17/03*  (2006.01)
(52) U.S. Cl. ..................... 720/677; 720/679
(58) Field of Classification Search .......... 720/671, 720/674–680

See application file for complete search history.

(56) References Cited

U.S. PATENT DOCUMENTS

| | | | |
|---|---|---|---|
| 5,615,204 A * | 3/1997 | Watanabe et al. | 720/679 |
| 6,512,734 B1 * | 1/2003 | Chang et al. | 720/675 |
| 2003/0081534 A1 * | 5/2003 | Omori | 369/263 |
| 2004/0008609 A1 * | 1/2004 | Fujibayashi et al. | 369/249 |
| 2005/0198660 A1 * | 9/2005 | Kim et al. | 720/679 |
| 2006/0080691 A1 * | 4/2006 | Chiu et al. | 720/676 |
| 2007/0050798 A1 * | 3/2007 | Watanabe | 720/677 |
| 2007/0083879 A1 * | 4/2007 | Burkart et al. | 720/675 |

FOREIGN PATENT DOCUMENTS

JP    2002-92898    3/2002

* cited by examiner

*Primary Examiner* — Nathan Danielsen
(74) *Attorney, Agent, or Firm* — Antonelli, Terry, Stout & Kraus, LLP.

(57) ABSTRACT

An optical disc apparatus capable of reducing looseness vibrations resulting from a gap between a sub-guide shaft and a bearing is provided. According to an optical disc apparatus in the present invention, both ends of the sub-guide shaft are supported by being sandwiched between a pair of support parts formed in a chassis and a pair of pressing members mounted on the chassis. The support part is formed by bending a protruding portion both protruding in an inward direction of a hole from an edge of the hole of the chassis and extending along the direction perpendicular to the sub-guide shaft.

16 Claims, 5 Drawing Sheets

OPTICAL DISC APPARATUS WITH SUPPORT PART CONFIGURED TO REDUCE VIBRATIONS

BACKGROUND OF THE INVENTION

1. Field of the Invention

The present invention relates to an optical disc apparatus for driving an optical disc such as a compact disc (CD), digital versatile disc (DVD), and blu-ray disc (BD).

2. Description of the Related Art

An optical disc apparatus has an optical pickup for recording information on an optical disc or replaying information from the optical disc. The optical pickup is slidably maintained on both a main guide shaft and a sub-guide shaft mounted on a chassis, via a bearing. Therefore, the optical pickup is movable in a disc radius direction relative to the chassis.

A support structure of the guide shaft of an optical disc apparatus commonly has a vibration isolation means. There are some cases in which the guide shaft or a support part of the guide shaft is formed of resin as such a vibration isolation means.

Japanese Patent Application Laid-Open No. 2002-92898 discloses a technology to fix a guide shaft by a pressing bar spring after being pressed against a screw provided in a chassis.

In recent years, optical discs of high recording capacity such as blu-ray discs have been increasingly coming into wide use. High positioning accuracy is demanded from an optical disc apparatus for optical discs of such high recording capacity. Particularly higher positioning accuracy in the focusing and tracking directions of an optical pickup is demanded from such an optical disc apparatus than from a conventional optical disc apparatus.

Looseness vibrations resulting from a gap between a sub-guide shaft and a bearing arise in an optical disc apparatus. If looseness vibrations arise, a reading or recording error of information occurs. The technology described in Japanese Patent Application Laid-Open No. 2002-92898 adjusts the position of a guide shaft relative to a chassis and cannot reduce looseness vibrations resulting from a gap between the guide shaft and the bearing.

An object of the present invention is to provide an optical disc apparatus capable of reducing looseness vibrations resulting from a gap between a sub-guide shaft and a bearing.

SUMMARY OF THE INVENTION

According to an optical disc apparatus in the present invention, both ends of a sub-guide shaft are supported by being sandwiched between a pair of support parts formed in a chassis and a pair of pressing members mounted on the chassis. The support part is formed by bending a protruding portion both protruding in an inward direction of a hole from an edge of the hole of the chassis and extending along the direction perpendicular to the sub-guide shaft.

The support part on the front side is arranged to be separated from a front edge of the hole of the chassis so that a space is created between the support part on the front side of the pair of support parts and the front edge of the hole of the chassis.

According to the present invention, looseness vibrations resulting from a gap between a sub-guide shaft and a bearing can be reduced.

EXPLANATIONS OF REFERENCE NUMERALS

1: Chassis
2: Spindle motor
3: Holding part
3a to 3c: Screw
4: Main guide shaft
5: Sub-guide shaft
6: Objective lens driving mechanism
7: Optical pickup
8a, 8b: Main bearing
9: Sub-bearing
10: Feed motor
11: Unit mechanism
12a, 12b: Support part
13a, 13b: Pressing member
14a, 15a: Screw
41, 42: Space part

DESCRIPTION OF THE PREFERRED EMBODIMENTS

A preferred embodiment to carry out an optical disc apparatus of the present invention will be described in detail below with reference to attached drawings. FIG. 1 to FIG. 5 are diagrams exemplifying the embodiment of the present invention and, in these figures, components to which the same reference numeral is attached represent the same component having a similar basic configuration and operation.

The configuration of an optical disc apparatus according to the present invention will be described with reference to FIG. 1. The optical disc apparatus in the present example records information on a recording surface of a disc 32 such as a compact disc (CD), digital versatile disc, (DVD), and blu-ray disc (BD) having dimensions of 120 mm in diameter and 1.2 mm in thickness and replays information from the recording surface.

The optical disc apparatus has a cabinet. The cabinet has a bottom cover 34 and a top cover 35 manufactured by pressing a metal plate such as a rolled steel, and has a mechanical base 33 made of, for example, resin molded components arranged therein. A disc tray 36 for loading and unloading the disc 32 is supported by a guide mechanism provided in the mechanical base 33.

The disc tray 36 has a circular recess 36A slightly larger than an external diameter of the disc 32 provided therein for positioning when the disc 32 is mounted.

The mechanical base 33 has a metallic chassis 1 mounted thereon. Four corners of the chassis 1 are elastically supported by the mechanical base 33 via insulators 37a, 37b, 37c, and 37d. The chassis 1 has a spindle motor 2 and an optical pickup 7 mounted thereon. The chassis 1, the spindle motor 2, and the optical pickup 7 are called a unit mechanism.

When the disc tray 36 is contained inside the apparatus, the optical pickup 7 is disposed below the disc tray 36 holding the disc 32.

Figure 1:
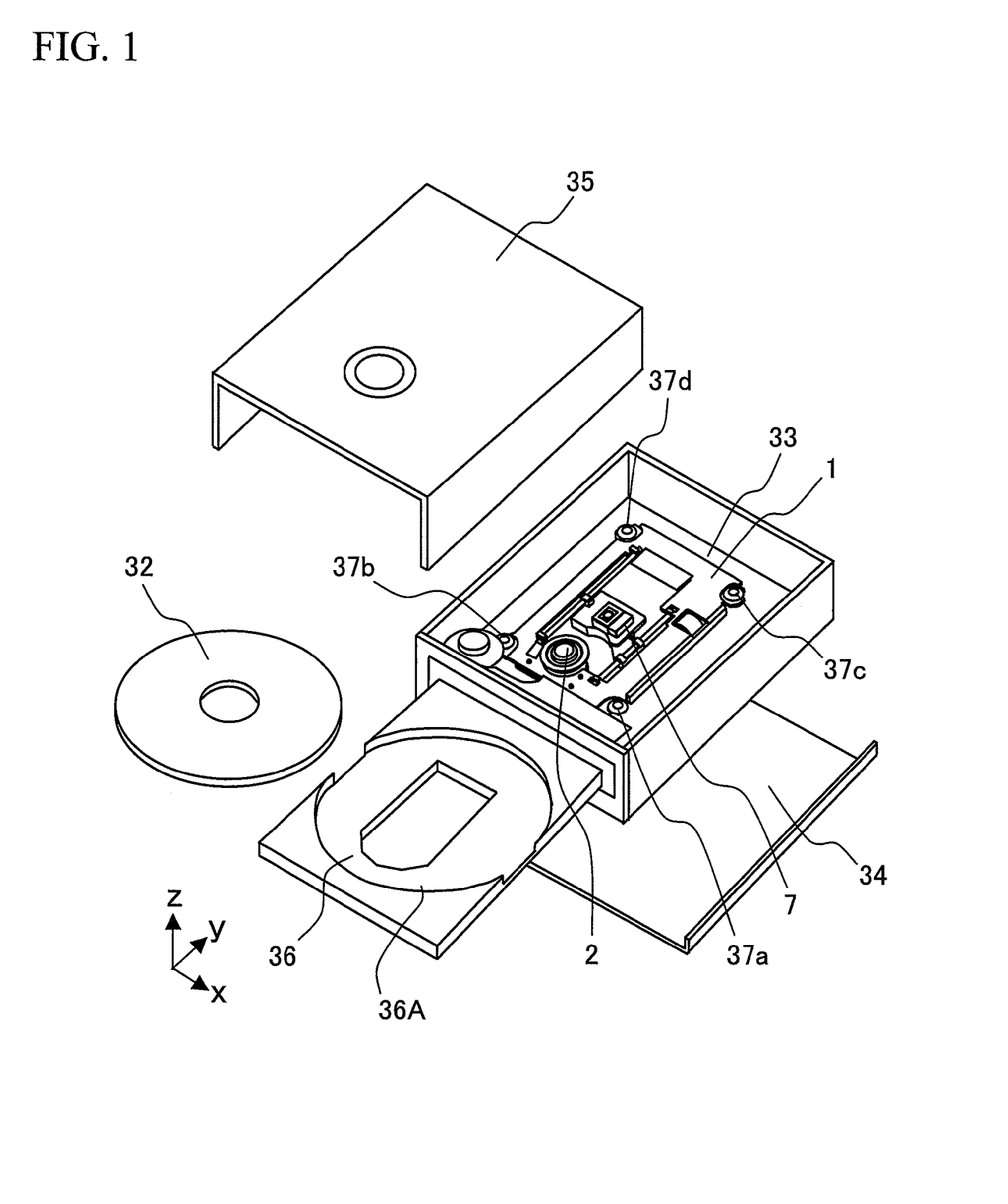
FIG. 1 is a diagram for illustrating a structure of an optical disc apparatus according to the present invention.

Incidentally, as illustrated in FIG. 1, the Y axis is set along the direction of movement of the disc tray 36, the X axis is set along the direction orthogonal to the Y axis on a horizontal plane, and the Z axis is set orthogonal to the X axis and the Y axis.

With regard to the direction of movement of the optical pickup 7, the tracking direction is the Y-axis direction and the focusing direction is the Z-axis direction.

The optical disc apparatus has a box-shaped form with dimensions of about 150 mm in width (x direction), about 195 mm in depth (y direction), and about 40 mm in thickness (z direction).

Figure 2:
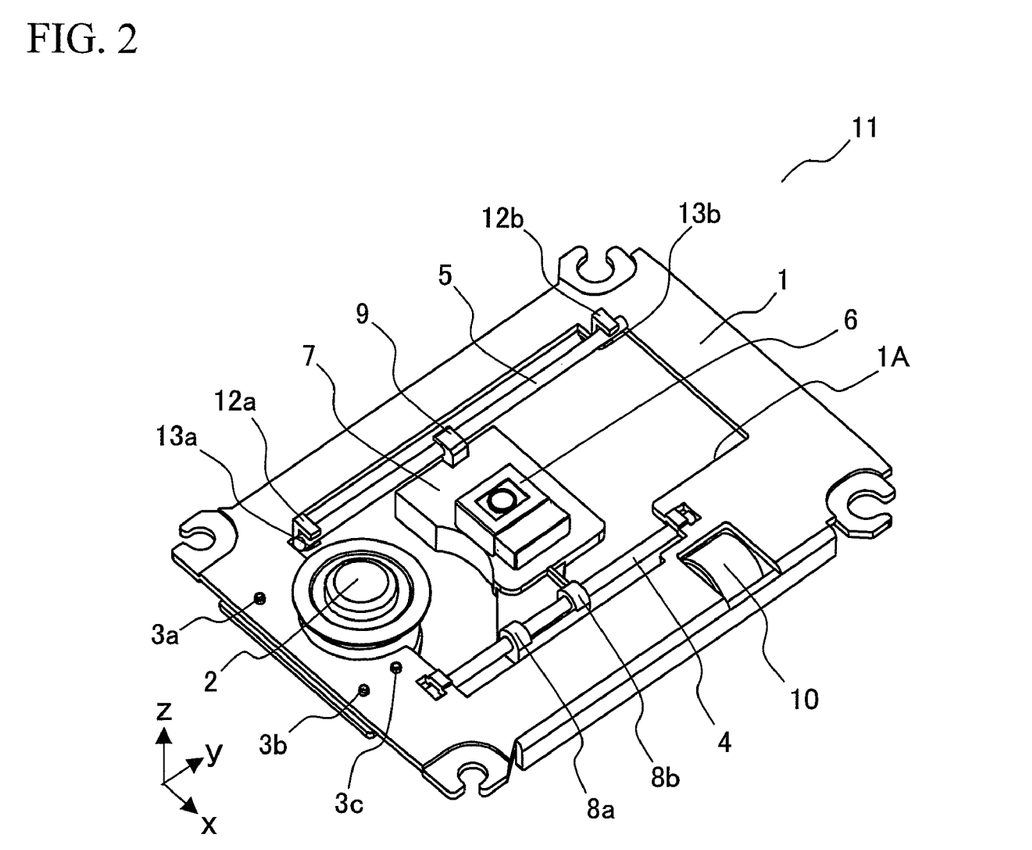
FIG. 2 is a diagram for illustrating the structure of a unit mechanism in the optical disc apparatus according to the present invention.

The structure of the unit mechanism of the optical disc apparatus in the present invention will be described with reference to FIG. 2. A unit mechanism 11 includes the metallic chassis 1, the spindle motor 2, and the optical pickup 7. The chassis 1 has a substantially rectangular hole 1A formed therein. A main guide shaft 4 is provided at one edge of the hole 1A and a sub-guide shaft 5 is provided at another edge. Both ends of the main guide shaft 4 and the sub-guide shaft 5 are each supported by the chassis, and support structures 12a, 13a, 12b, and 13b of the sub-guide shaft 5 will be described in detail with reference to drawings that follow.

The optical pickup 7 has an objective lens driving mechanism 6 for driving an objective lens for condensing light to a predetermined position of a disc mounted thereon. Bearings are mounted at both ends of the optical pickup 7. That is, two main bearings 8a and 8b are provided at one edge and one sub-bearing 9 is provided at the other edge. The main bearings 8a and 8b are engaged with the main guide shaft 4 and the sub-bearing 9 is engaged with the sub-guide shaft 5. Thus, the optical pickup 7 can move along the main guide shaft 4 and the sub-guide shaft 5. Incidentally, a feed motor 10 for moving the optical pickup 7 is arranged below the chassis 1.

The spindle motor 2 for rotating a disc is mounted at a front edge of the hole 1A of the chassis 1. Three screws 3a, 3b, and 3c are used to mount the spindle motor 2 on the chassis 1.

A gap provided between the sub-guide shaft 5 and the sub-bearing 9 to move the optical pickup 7 causes vibrations. Vibrations in the optical disc apparatus are caused by various factors. Here, vibrations caused by the spindle motor 2 will be described. The spindle motor 2 is mounted on the chassis 1 by the three screws 3a, 3b, and 3c. Vibrations of the spindle motor 2 will be transmitted to the chassis 1 via the three screws. When the vibrations are transmitted to the sub-guide shaft 5, the optical pickup 7 runs wild due to a gap (looseness) between the sub-guide shaft 5 and the sub-bearing 9, and the sub-guide shaft 5 and the sub-bearing 9 may collide with each other, causing looseness vibrations.

The main bearings 8a and 8b and the sub-bearing 9 may be ball bearings or sliding bearings. Regardless of the structure of the bearing, vibrations resulting from looseness between the sub-guide shaft 5 and the sub-bearing 9 will arise.

According to the present invention, as described below, an optical disc apparatus is structured to prevent transmission of vibrations from the spindle motor 2 to the sub-guide shaft 5.

A support structure for mounting both ends of the sub-guide shaft on the chassis in an optical disc apparatus according to the present invention will be described with reference to FIGS. 3A and 3B. The support structure of the sub-guide shaft may be the same at both ends and here, the support structure of the sub-guide shaft at one end will be described. The support structure of both support structures at both ends of sub-guide shaft to which vibrations from the spindle motor 2 may be transmitted is the one closer to the spindle motor 2. Therefore, the support structure according to the present invention might as well be adopted at least for the front one of the support structures at both ends of the sub-guide shaft.

Figure 3A:
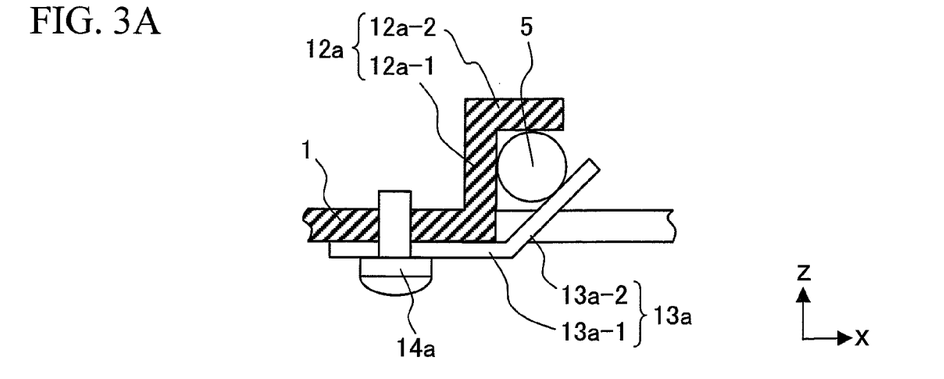
FIGS. 3A and 3B are diagrams for illustrating a support structure of a sub-guide shaft in the optical disc apparatus according to the present invention.

FIG. 3A shows a sectional configuration of the support structure of the sub-guide shaft in a first example. According to the present example, the support structure of the sub-guide shaft 5 has a support part 12a and a pressing member 13a. The support part 12a is comprised of a vertical part 12a-1 and a horizontal part 12a-2 and has an inverted L shaped cross section. The support part 12a is formed by bending a protruding portion of the chassis 1. Therefore, the support part 12a is a portion of the chassis 1, and is formed integrally with the chassis 1 and of the same material as that of the chassis 1.

The pressing member 13a is comprised of a horizontal part 13a-1 and an inclined part 13a-2. The pressing member 13a is produced by bending a metallic plate material. The pressing member 13a is produced as a member separate from the chassis 1. The pressing member 13a is mounted on the chassis 1 by a screw 14a. The inclined part 13a-2 of the pressing member 13a has a spring structure. When, as shown in FIG. 3A, the sub-guide shaft is supported by the pressing member 13a, the inclined part 13a-2 is inclined with respect to the horizontal part 13a-1, for example, by about 45 degrees. The sub-guide shaft 5 is supported by being reliably sandwiched between the support part 12a and the pressing member 13a by the spring function of the inclined part 13a-2 of the pressing member 13a.

According to the present example, the screw 14a is mounted on one side of the sub-guide shaft 5, that is, on the side opposite to the hole 1A of the chassis 1 with respect to the sub-guide shaft 5. The support part 12a and the pressing member 13a extend in the direction of the sub-guide shaft 5 from the position where the screw 14a is mounted and toward the hole 1A of the chassis 1.

As shown in FIG. 3A, the sub-guide shaft 5 is in contact at three points, that is, with the vertical part 12a-1 and the horizontal part 12a-2 of the support part 12a and the inclined part 13a-2 of the pressing member 13a. The sub-guide shaft 5 receives pressure force from the inclined part 13a-2 of the pressing member 13a due to the spring function of the inclined part 13a-2 of the pressing member 13a. The pressure force acts in the center direction of the sub-guide shaft 5 at a point of contact of the sub-guide shaft 5 and the inclined part 13a-2 of the pressing member 13a. The sub-guide shaft 5 is pressed against both the vertical part 12a-1 and the horizontal part 12a-2 of the support part 12a by the pressure force. Thus, the sub-guide shaft 5 is supported at three points of contact in this manner and does not move in any direction in an XZ plane.

That is, the vertical part 12a-1 of the support part 12a has a positioning function of the sub-guide shaft 5 in the X-axis direction. The horizontal part 12a-2 of the support part 12a has a positioning function of the sub-guide shaft 5 in the Z-axis direction (focusing direction). Thus, in the present example, the positioning accuracy of the sub-guide shaft 5 in the X-axis and Z-axis directions can be secured.

Figure 3B:
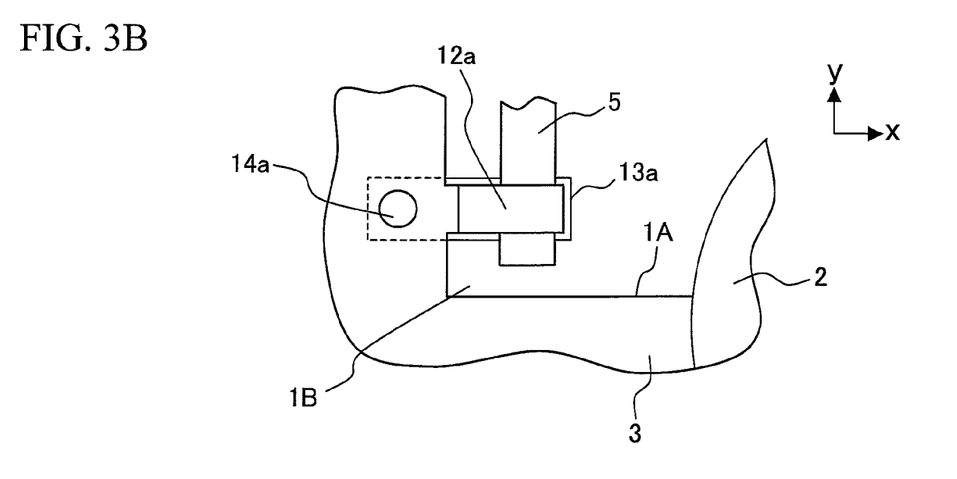

FIG. 3B shows a plane configuration around the support structure of the sub-guide shaft in the first example. Features of the optical disc apparatus according to the present invention will be described with reference to FIG. 3B. As described above, vibrations of the spindle motor 2 are transmitted to the chassis 1 via the three screws 3a, 3b, and 3c. The positions of the three screws 3a, 3b, and 3c depend on the support structure of the spindle motor 2. However, the three screws 3a, 3b, and 3c are arranged around the spindle motor 2 and positioned at least at a front end portion of the chassis 1. Thus, in FIG. 3B, the positions of the three screws 3a, 3b, and 3c are called a holding part 3.

Vibrations from the spindle motor 2 are transmitted to the chassis via the three screws 3a, 3b, and 3c and spread concentrically around the centers of the three screws 3a, 3b, and 3c. That is, vibrations are transmitted radially along radius directions of circles around the three screws 3a, 3b, and 3c. When vibrations from the spindle motor 2 directly reach the sub-guide shaft 5, looseness vibrations arise due to looseness between the sub-guide shaft 5 and the sub-bearing 9, thereby producing noise.

According to the present invention, the sub-guide shaft 5 is supported by the support part 12a. Therefore, when vibrations are transmitted to the sub-guide shaft 5, the vibrations must be transmitted via the support part 12a. The support part 12a protrudes from an edge of the hole 1A of the chassis. Therefore, the path of vibrations to be transmitted to the support part 12a is in a direction perpendicular to the sub-guide shaft 5. The paths of vibrations from the spindle motor 2, on the other hand, pass through the holding part 3 and extend radially. As shown in FIG. 3B, a hole 1B of the chassis is present between the holding part 3 and the support part 12a. Therefore, the path of vibrations from the spindle motor 2 is clearly different from that of vibrations to be transmitted to the support part 12a. Therefore, vibrations from the spindle motor 2 are not directly transmitted to the sub-guide shaft 5. Consequently, in the present example, looseness vibrations resulting from a gap between the sub-guide shaft 5 and the sub-bearing 9 can be prevented from arising.

According to the present invention, the support part 12a is produced by bending the chassis 1. Further, the hole 1B of the chassis is obtained by suitably designing the shape of the hole of the chassis. Therefore, according to the present invention, looseness vibrations resulting from a gap between the sub-guide shaft 5 and the sub-bearing 9 can be prevented from arising at low costs while avoiding an increase in the number of parts.

An optical disc apparatus according to the present invention can be manufactured without significantly changing manufacturing process of a conventional optical disc apparatus and therefore, additional equipment costs can be made unnecessary.

Further, according to the present invention, the positioning accuracy of the sub-guide shaft 5 in the X-axis and Z-axis (focusing direction) directions can be secured by providing the support part 12a with the vertical part 12a-1 and the horizontal part 12a-2.

As described above, while a slight gap is commonly provided between the sub-guide shaft 5 and the sub-bearing 9, no gap is provided between the main guide shaft 4 and the main bearings 8a and 8b. Therefore, vibrations resulting from looseness between the main guide shaft 4 and the main bearings 8a and 8b do not arise or can be ignored. However, there is a possibility that similar looseness vibrations arise between the main guide shaft 4 and the main bearings 8a and 8b. Thus, a support structure similar to that of the sub-guide shaft 5 may be adopted for the support structure of the main guide shaft 4.

However, the support structure of a guide shaft according to the present invention can more effectively reduce vibrations when adopted for the sub-guide shaft 5 rather than for the main guide shaft 4.

Figure 4A:
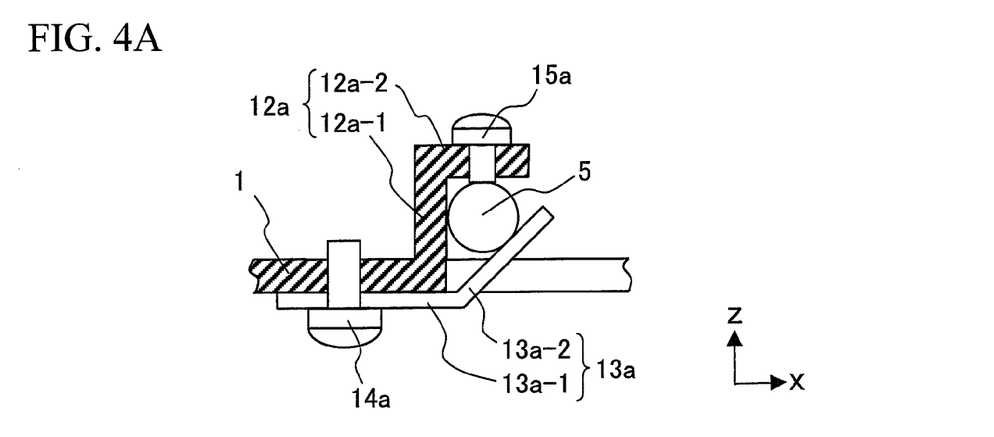
FIGS. 4A and 4B are diagrams for illustrating another example of the support structure of the sub-guide shaft in the optical disc apparatus according to the present invention.

Another example of the support structure of the sub-guide shaft of an optical disc apparatus in the present invention will be described with reference to FIGS. 4A and 4B. FIG. 4A shows a second example of the support structure of the sub-guide shaft of an optical disc apparatus in the present invention. The support structure in the present example is a modification of the first example shown in FIGS. 3A and 3B. In the present example, a screw 15a is arranged in the horizontal part 12a-2 of the support part 12a. The support structure of the sub-guide shaft in the present example is different from that in the first example shown in FIGS. 3A and 3B in that the screw 15a is provided and may otherwise be the same as the first example. The lower end of the screw 15a is abutted on the sub-guide shaft 5. The position of the screw 15a in the vertical direction is changed by rotating the screw 15a, thereby adjusting the height of the sub-guide shaft 5. That is, the positioning accuracy of the sub-guide shaft in the focusing direction (Z-axis direction) can be improved. Though not shown, a means for fixing the screw 15a after being positioned may be provided, but a means for tightening up a screw is well known and will not be described herein.

Thus, it becomes possible to reduce variations of the assembly position such as those of the mounting position of the spindle motor 2. Therefore, according to the present invention, a recording or replaying error of disc information can be prevented so that an optical disc apparatus of high reliability can be provided.

Figure 4B:
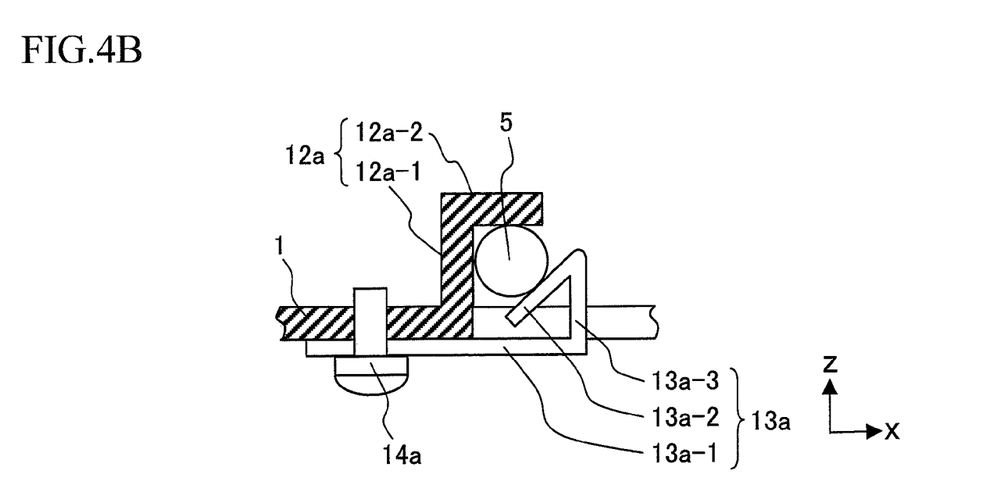

FIG. 4B shows a third example of the support structure of the sub-guide shaft of an optical disc apparatus in the present invention. The support structure in the present example is different from that in the first example shown in FIGS. 3A and 3B, in structure in regard to the pressing member 13a, and may otherwise be the same as the first example. The pressing member 13a in the present example is comprised of the horizontal part 13a-1, the inclined part 13a-2, and a bent part 13a-3.

The bent part 13a-3 is bent in a direction substantially perpendicular to the horizontal part 13a-1. The inclined part 13a-2 is formed by the tip of the bent part 13a-3 being further bent. The pressing member 13a in the present example is produced by, for example, bending a metallic plate material. The pressing member 13a is produced as a member separate from the chassis 1. The pressing member 13a is mounted on the chassis 1 by the screw 14a.

The inclined part 13a-2 of the pressing member 13a has a spring structure. In the present example, the bent part 13a-3 of the pressing member 13a also has a spring structure. However, the spring function of the bent part 13a-3 is smaller than that of the inclined part 13a-2. Therefore, spring rigidity of the pressing member 13a in the present example is larger than that in the first example. In the present example, the inclined part 13a-2 of the pressing member 13a is prevented from undergoing a plastic deformation even if a load such as an impact is applied to the sub-guide shaft 5. Therefore, the sub-guide shaft can be prevented from dropping due to a plastic deformation of the pressing member 13a.

When the sub-guide shaft is supported by the pressing member 13a, as shown in FIG. 4B, the inclined part 13a-2 is inclined, for example, by about 45 degrees with respect to the bent part 13a-3. The sub-guide shaft 5 is supported by being reliably sandwiched between the support part 12a and the pressing member 13a by the spring functions of the inclined part 13a-2 and the bent part 13a-3 of the pressing member 13a.

Like the first example, the sub-guide shaft 5 in the present example is in contact at three points, that is, with the vertical part 12a-1 and the horizontal part 12a-2 of the support part 12a and the inclined part 13a-2 of the pressing member 13a. Therefore, the positioning accuracy of the sub-guide shaft 5 in the X-axis and Z-axis directions can be secured.

Incidentally, like the example in FIG. 4A, the screw 15a for positioning may also be provided in the present example in the horizontal part 12a-2 of the support part 12a.

Figure 5:
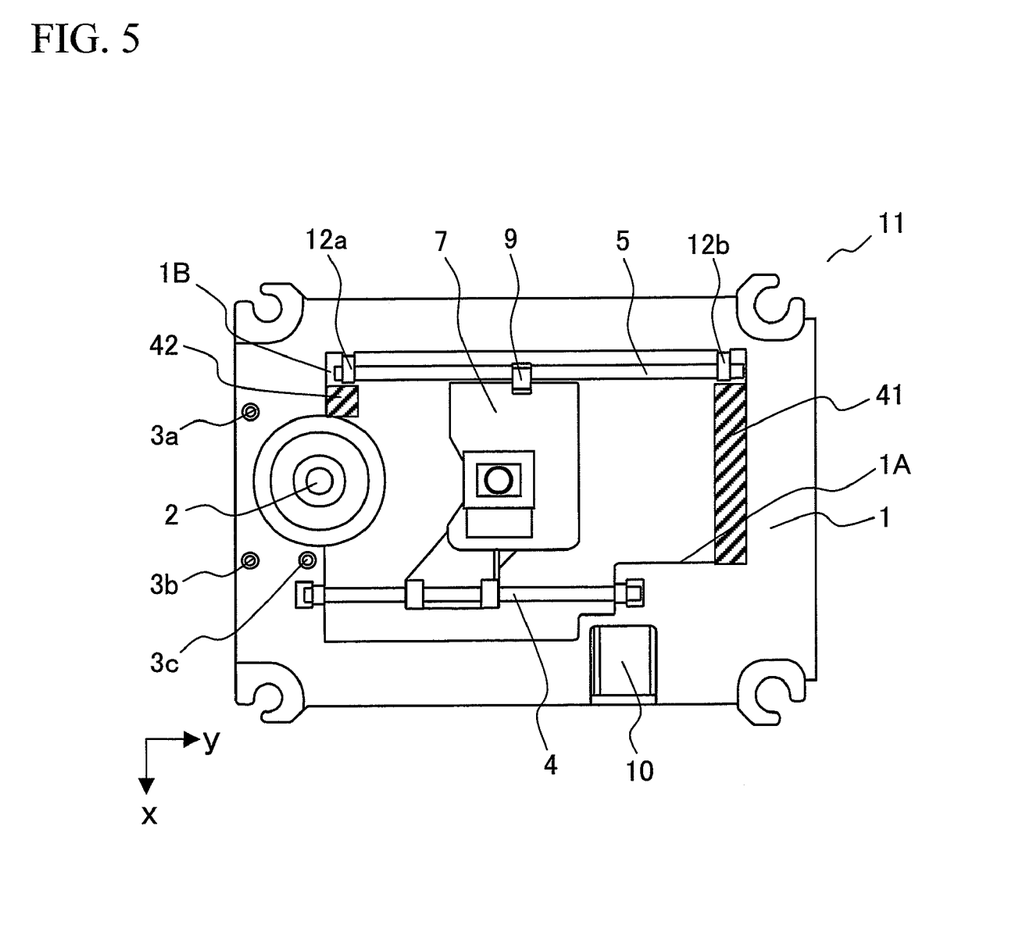
FIG. 5 is a diagram for illustrating the structure of a hole of a chassis in the optical disc apparatus according to the present invention.

The optical disc apparatus in the present invention will further be described with reference to FIG. 5. As already described with reference to FIG. 3B, the support parts 12a and 12b are formed of protruding portions of the chassis 1, in the support structure of the sub-guide shaft of the optical disc apparatus in the present invention. Thus, the dimension in the Y-axis direction of the hole 1A of the chassis is larger than that of the sub-guide shaft 5. Thus, a space part 41 is formed at a rear portion of the hole 1A of the chassis. That is, the hole 1A of the chassis is larger than that of a conventional optical disc apparatus by the dimension of the space part 41. Consequently, this additional space part 41 can be used effectively. For example, a member positioned in a rear portion of the optical disc apparatus, for example, a connector may be arranged in the space part 41. Accordingly, the depth dimension of the optical disc apparatus can be made smaller, leading to a smaller version of the optical disc apparatus.

Since the hole 1A of the chassis has a dimension larger than that of the sub-guide shaft in the present example, the hole 1B of the chassis is present between the chassis 1 and the front end of the sub-guide shaft 5. In addition, a space part 42 is formed at the front portion of the hole 1A of the chassis. That is, the hole 1A of the chassis is larger than that of a conventional optical disc apparatus by the dimension of the space part 42. An impact absorption member for absorbing an impact caused by the optical pickup 7, for example, rubber is commonly arranged in the space part 42. The amount of change of the impact absorption member offers a travel distance of the optical pickup 7 after coming into contact with the impact absorption member before being brought to a standstill, that is, a shock eliminating stroke. The longer the shock eliminating stroke, the better it is. To increase the shock eliminating stroke, dimensions of the impact absorption member need to be increased. In the present example, a large-size impact absorption member can be arranged in the space part 42. An impact absorption member may be provided also in the space part 41 at the rear portion of the hole 1A of the chassis. Thus, according to the present invention, an optical disc apparatus resistant to impact can be obtained.

Examples of the present invention have been described above, but the present invention is not limited to the above examples and those skilled in the art will easily understand that the present invention can be modified in various ways within the scope of the invention defined by the claims.

What is claimed is:

1. An optical disc apparatus having an optical pickup for replaying information recorded on an optical disc or recording information on the optical disc, a main bearing provided at one edge of the optical pickup, a sub-bearing provided at another edge of the optical pickup, a main guide shaft engaging with the main bearing, a sub-guide shaft engaging with the sub-bearing, a chassis having a hole in which the optical pickup moving along the main guide shaft and the sub-guide shaft is arranged, a spindle motor mounted on a front end portion of the chassis to rotate the optical disc, and a cabinet having a top cover and a bottom cover for housing the chassis, wherein both ends of the sub-guide shaft are supported by being sandwiched between a pair of support parts formed in the chassis and a pair of pressing members mounted on the chassis, each of the support parts of the chassis is formed by bending a protruding portion both protruding in an inward direction of the hole from a side edge of the hole of the chassis and extending along the inward direction perpendicular to the sub-guide shaft, and the support part on the side of the spindle motor is arranged to be separated from a front edge of the hole of the chassis so that a space is created between the support part on the spindle motor side of the pair of support parts and the front edge of the hole of the chassis;

wherein the space created between the support part on the spindle motor side of the pair of support parts and the front edge of the hole of the chassis results in an indirect vibration path, thereby reducing vibrations transmitted from the motor to the sub-guide shaft.

2. The optical disc apparatus according to claim 1, wherein a screw is inserted through the support part and a lower end of the screw is abutted on the sub-guide shaft so that a position of the sub-guide shaft in a vertical direction can be adjusted by rotating the screw.

3. The optical disc apparatus according to claim 1, wherein the pressing member has a horizontal part arranged along a principal surface of the chassis and an inclined part inclined with respect to the horizontal part and abutted on the sub-guide shaft, the inclined part is constructed to become elastically deformed relative to the horizontal part, and the sub-guide shaft is pressed against the support part by a spring force resulting from the elastic deformation.

4. The optical disc apparatus according to claim 1, wherein the pressing member has a horizontal part arranged along a principal surface of the chassis, a vertical part arranged in a direction perpendicular to the horizontal part, and an inclined part inclined with respect to the vertical part and abutted on the sub-guide shaft, the inclined part is constructed to become elastically deformed relative to the horizontal part, and the sub-guide shaft is pressed against the support part by a spring force resulting from the elastic deformation.

5. The optical disc apparatus according to claim 1, wherein the pressing member is fixed to the chassis by a fixing means and the fixing means is arranged on the side opposite to the hole of the chassis with respect to the sub-guide shaft.

6. The optical disc apparatus according to claim 1, wherein an impact absorption member is provided at a front portion of the hole of the chassis.

7. The optical disc apparatus according to claim 1,
wherein each of the support parts of the chassis extends along a direction perpendicular to the axis of the sub-guide shaft and parallel to the plane defined by the chassis, without further bending or changes of direction.

8. The optical disc apparatus according to claim 1,
wherein each of a plurality of corners of the chassis are elastically supported by a mechanical base via an insulator therein, including a corner of the chassis proximate to the spindle motor side of the pair of support parts and the front edge of the hole of the chassis.

9. An optical disc apparatus, comprising:
an optical pickup configured to replay information recorded on an optical disc or recording information on the optical disc;
a main bearing provided at one edge of the optical pickup;
a sub-bearing provided at another edge of the optical pickup;
a main guide shaft configured to engage with the main bearing;
a sub-guide shaft configured to engage with the sub-bearing;
a chassis, having a hole in which the optical pickup is configured to move along the main guide shaft and the sub-guide shaft;
a pair of support parts formed in the chassis;
a pair of pressing members mounted on the chassis;

a spindle motor mounted on a front end portion of the chassis and configured to rotate the optical disc; and a cabinet having a top cover and a bottom cover, configured to house the chassis;

wherein both ends of the sub-guide shaft are supported by being sandwiched between the pair of support parts formed in the chassis and the pair of pressing members mounted on the chassis;

wherein each of the support parts of the chassis is formed by bending a protruding portion both protruding in an inward direction of the hole from a side edge of the hole of the chassis and extending along the inward direction perpendicular to the sub-guide shaft; and wherein the support part on the side of the spindle motor is arranged to be separated from a front edge of the hole of the chassis so that a space is created between the support part on the spindle motor side of the pair of support parts and the front edge of the hole of the chassis.

10. The optical disc apparatus according to claim 9, wherein a screw is disposed through the support part, and a lower end of the screw is abutted on the sub-guide shaft, thereby enabling a position of the sub-guide shaft in a vertical direction to be adjusted by rotating the screw.

11. The optical disc apparatus according to claim 9, wherein the pressing member has a horizontal part arranged along a principal surface of the chassis and an inclined part inclined with respect to the horizontal part and abutted on the sub-guide shaft;

wherein the inclined part is constructed to become elastically deformed relative to the horizontal part; and wherein a spring force resulting from the elastic deformation is configured to press the sub-guide shaft against the support part.

12. The optical disc apparatus according to claim 9, wherein the pressing member has a horizontal part arranged along a principal surface of the chassis, a vertical part arranged in a direction perpendicular to the horizontal part, and an inclined part inclined with respect to the vertical part and abutted on the sub-guide shaft;

wherein the inclined part is constructed to become elastically deformed relative to the horizontal part; and wherein a spring force resulting from the elastic deformation is configured to press the sub-guide shaft against the support part.

13. The optical disc apparatus according to claim 9, wherein the pressing member is fixed to the chassis by a fixing means and the fixing means is arranged on the side opposite to the hole of the chassis with respect to the sub-guide shaft.

14. The optical disc apparatus according to claim 9, wherein an impact absorption member is provided at a front portion of the hole of the chassis.

15. The optical disc apparatus according to claim 9, wherein each of the support parts of the chassis extends along a direction perpendicular to the axis of sub-guide shaft and parallel to the plane defined by the chassis, without further bending or changes of direction.

16. The optical disc apparatus according to claim 9, wherein each of a plurality of corners of the chassis are elastically supported by a mechanical base via an insulator therein, including a corner of the chassis proximate to the spindle motor side of the pair of support parts and the front edge of the hole of the chassis.

* * * * *